United States Patent
Bonnard et al.

(10) Patent No.: US 7,796,748 B2
(45) Date of Patent: Sep. 14, 2010

(54) TELECOMMUNICATION TERMINAL ABLE TO MODIFY THE VOICE TRANSMITTED DURING A TELEPHONE CALL

(75) Inventors: Pierre Bonnard, Suresnes (FR); Ivan Bourmeyster, Paris (FR); Xavier Fourquin, Sevres (FR); Pierre Ladouce, Franconville (FR)

(73) Assignee: IPG Electronics 504 Limited, St. Peter Port (GG)

( * ) Notice: Subject to any disclaimer, the term of this patent is extended or adjusted under 35 U.S.C. 154(b) by 0 days.

(21) Appl. No.: 10/438,143

(22) Filed: May 15, 2003

(65) Prior Publication Data

US 2003/0215085 A1 Nov. 20, 2003

(30) Foreign Application Priority Data

May 16, 2002 (FR) .................................. 02 06035

(51) Int. Cl.
H04M 1/00 (2006.01)
H04M 9/00 (2006.01)

(52) U.S. Cl. ................................ 379/387.02

(58) Field of Classification Search ................ 379/387, 379/387.01–397
See application file for complete search history.

(56) References Cited

U.S. PATENT DOCUMENTS

| | | | | | |
|---|---|---|---|---|---|
| 4,823,380 | A * | 4/1989 | Kohen et al. | ............ | 379/387.02 |
| 4,868,867 | A * | 9/1989 | Davidson et al. | ......... | 704/200.1 |
| 5,255,339 | A * | 10/1993 | Fette et al. | ................... | 704/200 |
| 5,526,464 | A * | 6/1996 | Mermelstein | ................ | 704/219 |
| 5,567,901 | A * | 10/1996 | Gibson et al. | .................. | 84/603 |
| 5,692,101 | A | 11/1997 | Gerson et al. | | |
| 5,926,785 | A * | 7/1999 | Akamine et al. | ............ | 704/219 |
| 5,940,797 | A * | 8/1999 | Abe | .......................... | 704/260 |
| 5,956,685 | A | 9/1999 | Tenpaku et al. | ............. | 704/278 |
| 6,289,313 | B1 * | 9/2001 | Heinonen et al. | ........... | 704/270 |
| 6,424,822 | B1 * | 7/2002 | Mekuria et al. | ................ | 455/72 |
| 6,463,128 | B1 * | 10/2002 | Elwin | ........................... | 379/52 |
| 6,611,800 | B1 * | 8/2003 | Nishiguchi et al. | ........... | 704/221 |
| 2001/0006901 | A1 | 7/2001 | Ryu | | |
| 2003/0028380 | A1 * | 2/2003 | Freeland et al. | ............. | 704/260 |
| 2003/0135374 | A1 * | 7/2003 | Hardwick | .................... | 704/264 |

FOREIGN PATENT DOCUMENTS

| | | |
|---|---|---|
| EP | 1126439 A2 | 8/2001 |
| JP | 11-289361 A * | 10/1999 |
| WO | WO 98/35340 | 8/1998 |

OTHER PUBLICATIONS

Translation: JP 11-289361 A, Oct. 1999, Japan, Yuka.*
Patent Abstracts of Japan, vol. 2000, No. 01, Jan. 31, 2000 corresponding to JP 11289361 A (NEC Corp.) dated Oct. 19, 1999.

* cited by examiner

Primary Examiner—Alexander Jamal
(74) Attorney, Agent, or Firm—Volpe and Koenig, P.C.

(57) ABSTRACT

A telecommunication terminal receives an analog speech signal from a user of the terminal and converts the analog speech signal into a digital signal. A vocoder applies source coding to the speech signal and extracts reconstruction parameters from the speech signal. The reconstruction parameters are modified so that the transmitted voice associated with the signal is modified.

11 Claims, 2 Drawing Sheets

TELECOMMUNICATION TERMINAL ABLE TO MODIFY THE VOICE TRANSMITTED DURING A TELEPHONE CALL

CROSS-REFERENCE TO RELATED APPLICATIONS

This application is based on French Patent Application No. 02 06 035 filed May 16, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a telecommunication terminal able to modify the voice transmitted during a telephone call, more especially suited to a mobile telephone system.

2. Description of the Prior Art

Although speech transmission remains the core of mobile telephony, it is nevertheless a fact that manufacturers attempt to differentiate their products by offering the consumer new, attractive and amusing services. Games, voice recognition related services, and the multiplicity of ring tones are examples of this.

These new services often imply an additional cost of the telephone, associated with additional software or hardware.

The present invention aims to provide a telecommunication terminal offering the attractive and amusing service of modifying the voice transmitted by the user of the terminal during a telephone call, the service being implemented in a simple and economic way.

SUMMARY OF THE INVENTION

To this end, the present invention proposes a telecommunication terminal including means for input of an analog speech signal by a user of the terminal, means for converting the analog speech signal into a digital signal, a vocoder for applying source coding to the speech signal and including means for extracting reconstruction parameters from the speech signal, and means for modifying the reconstruction parameters so that the transmitted voice associated with the signal is modified.

The invention implements a service for modifying the voice transmitted by a mobile telephone simply and economically by using a vocoder already present in the telephone for voice coding. The reconstruction parameters are representative of the voice to be transmitted, and modifying them operates directly on the sonority of the voice transmitted.

The means for modifying the reconstruction parameters advantageously include means for modifying a parameter representative of the fundamental frequency of the voice.

In one embodiment the source coding of the speech signal is RPE-LTP coding.

The means for modifying the reconstruction parameters advantageously include means for modifying the short-term filter parameters of the vocoder.

The short-term filter parameters are, for example, the reflection coefficients known as log area ratio (LAR) coefficients determined during RPE-LTP coding.

In one variant, the means for modifying the reconstruction parameters include means for modifying the long-term filter parameters of the vocoder.

One long-term filter parameter is, for example, the fundamental frequency associated with a particular pitch using RPE-LTP coding.

The means for modifying the reconstruction parameters advantageously include means for modifying the parameters associated with excitation magnitudes.

A parameter associated with an excitation magnitude can be, for example, a parameter defining the pulsed excitation signal determined during RPE-LTP coding.

In one embodiment, the means for modifying the reconstruction parameters include means for modifying the parameters as a function of coded data representative of a set of notes defined by their frequencies and their respective durations.

The terminal advantageously includes means for selecting a type of modification of the voice to be transmitted.

The terminal advantageously includes means for manually configuring the modifications of the reconstruction parameters of the speech signal.

In one embodiment, the terminal includes means for executing the modifications in a test mode.

The terminal is advantageously a mobile telephone.

Other features and advantages of the present invention will become apparent in the course of the following description of one embodiment of the invention, which is given by way of illustrative and nonlimiting example.

DETAILED DESCRIPTION OF THE PREFERRED EMBODIMENT

Items common to both figures are identified by the same reference number in both figures.

Figure 1:
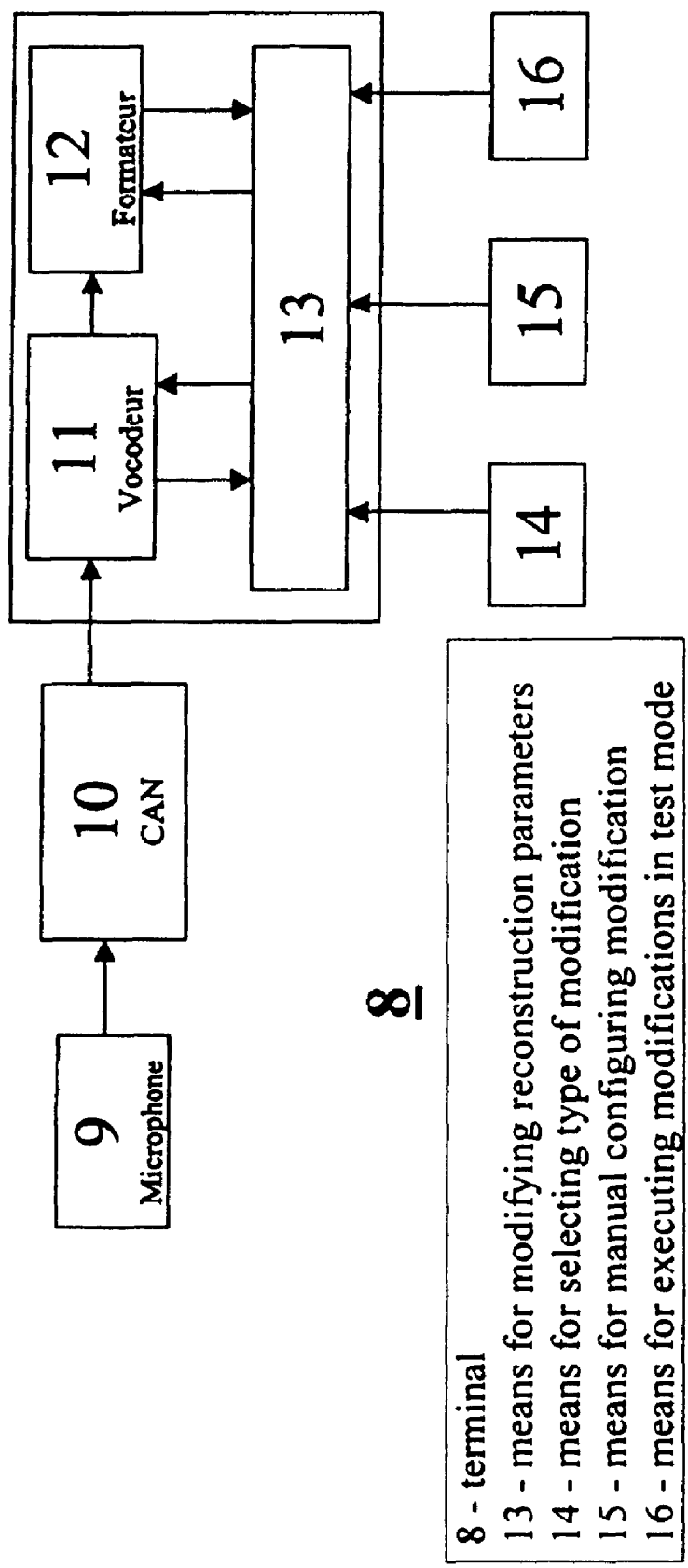
FIG. 1 is a diagram showing a telecommunication terminal according to the invention.

FIG. 1 shows a telecommunication terminal 8 according to the invention, such as a mobile telephone.

The terminal 8 includes a microphone 9, an analog-digital converter 10, a vocoder 11, a data formatter 12, means 13 for modifying voice reconstruction parameters, means 14 for selecting a type of modification of the voice to be transmitted, means 15 for manually configuring the modification of the speech signal reconstruction parameters, and means 16 for executing modifications in a test mode.

The vocoder 11, the data formatter 12, and the means 13 for modifying the voice reconstruction parameters are described below with reference to FIG. 2.

Figure 2:
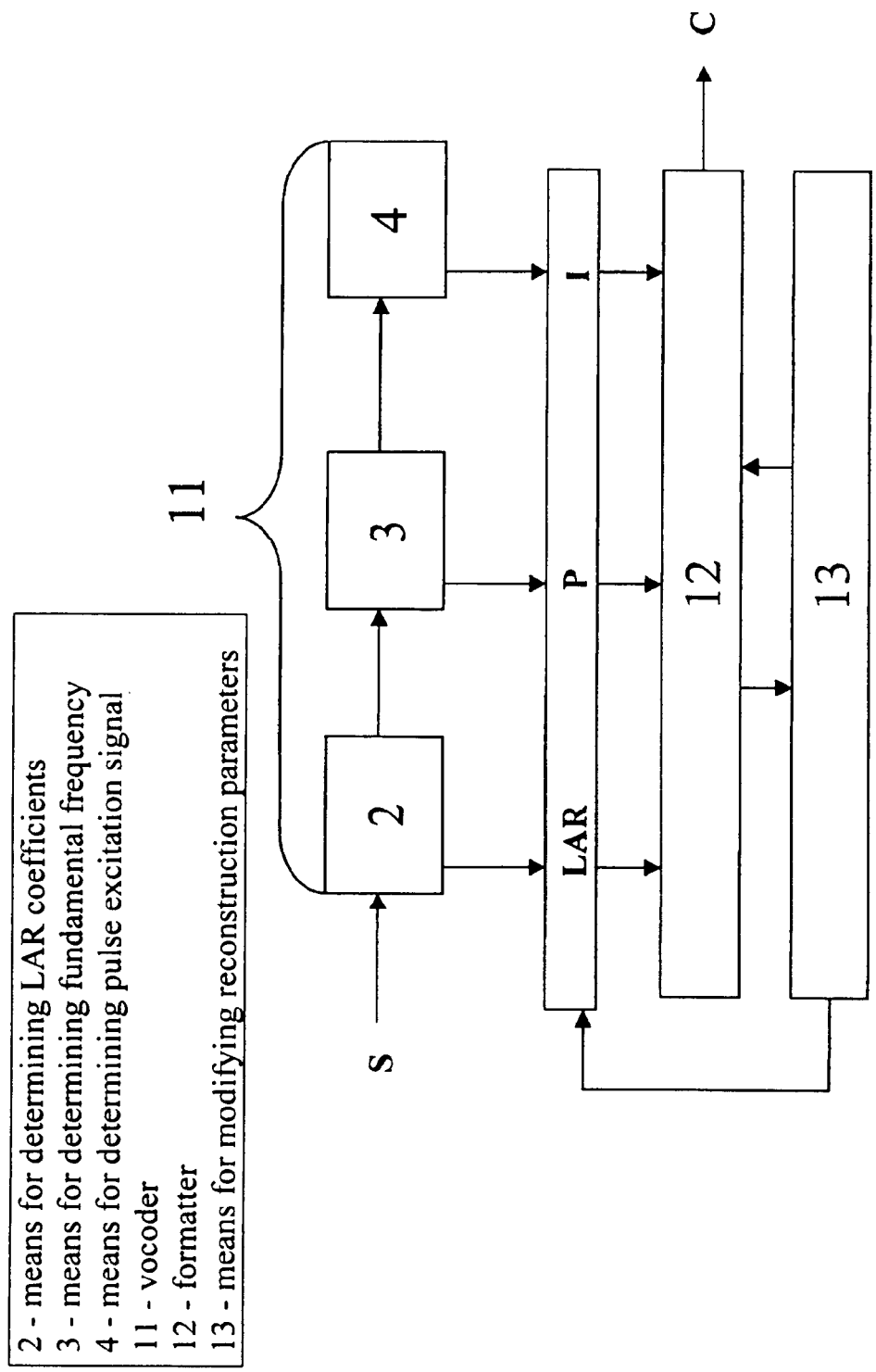
FIG. 2 is a diagram showing the coding and voice modifying means used in a telecommunication terminal according to the invention employing RPE-LTP coding conforming to the GSM standard 06.10.

FIG. 2 shows a vocoder 11 for executing RPE-LTP coding conforming to the GSM standard 06.10, a data stream formatter 12, and means 13 for modifying voice reconstruction parameters. The vocoder 11, the formatter 12 and the means 13 are implemented in software executed by a programmable processor, not shown.

The vocoder 11 includes means 2 for determining LAR reflection coefficients, means 3 for determining a fundamental frequency of the voice, and means 4 for determining a pulsed excitation signal, from a sampled signal S.

RPE-LTP coding models the speech signal as a linear filter whose parameters change with time and which is excited by a pulsed signal. It is therefore clear that the objective of such coding is to determine the pulsed excitation signal, the parameters defining the linear filter, and the fundamental frequency of the voice to be transmitted. This type of speech coding operates over 20 ms frames in the frequency band from 300

Hz to 3 400 Hz. The linear filter is in two parts: a first part takes account of short-term correlations of the speech signal, and a second part takes account of long-term correlations of the speech signal. They are referred to hereinafter as the short-term filter and the long-term filter.

The signal S constitutes a 20 ms speech frame sampled at 8 kHz.

The means 2 determine the LAR reflection coefficients of the short-term filter. To this end, the Durbin algorithm is applied to the filtered signal in order to obtain a linear prediction therefrom. The Durbin algorithm generates ten reflection coefficients, known as LAR coefficients, from −1 to 1 and expressed on a log area ratio (LAR) logarithmic scale.

The means 3 for determining a fundamental frequency of the voice use a prediction method associated with the long-term filter over 5 ms frames and reproduce the fundamental frequency associated with a pitch P from 56 Hz to 444 Hz and characteristics of the speaker, as well as the gain associated with the fundamental frequency.

The means 4 determine the pulsed excitation signal I.

The data stream formatter 12 formats all the data supplied by the means 2, 3 and 4 for a 20 ms frame and produces a coded speech signal C.

When the above parameters have been defined, different effects can be produced on the voice by modifying the parameters LAR, P and I. The modifier means 13 can modify these parameters.

Thus the modifier means 13 can modify only the value of the pitch associated with the fundamental frequency to transform a man's voice into a woman's voice. For this, the pitch value P of each frame is modified to a value Min (P+$P_{effect}$, Max (P)), where $P_{effect}$ is a predefined value, for example 90 Hz, and Max (P) is the maximum pitch value accepted by the standard system. A masculine voice has a pitch value of approximately 120 Hz whereas a feminine voice has a pitch value of approximately 210 Hz.

The modifier means 13 can in a similar way transform a woman's voice into a man's voice. For this, the pitch value P of each frame is modified into a value Max (P−$P_{effect}$, Min (P)), where $P_{effect}$ is a predefined value of 90 Hz and Min (P) is the minimum pitch value accepted by the standard system.

A whispering effect can also be obtained if the means 13 modify the pitch and the gain. For this, the modifier means 13 increase the pitch and reduce the gain so that the output signal of the long-term filter is significantly modified by reducing the effect of the vibrations of the vocal chords. The LAR parameters remain unchanged.

A robot voice effect can also be obtained if the means 13 modify the parameters of the long-term filter. For this, the pitch is set at a relatively high value. As for the whispering effect, the "prosody" (i.e. the combination of phonic elements that characterize spoken language) is completely modified and transformed into a monotonous sound having a single fundamental frequency and unchanged LAR parameters.

Another remarkable property of the parameters of the Vocoders is that, because the LAR parameters represent the vocal tract and the nasal tract associated with the production of speech, these two tracts can be modeled by "all-pole" resonant filters, each pole representing one resonant frequency. Because the production of speech involves the vocal tract and the nasal tract, the modifier means 13 can modify these parameters so that the vowels resonate like those of a person with a blocked nose.

The vocal tract and the nasal tract can each be modeled by an all-pole filter, but the sum of the two filters does not have the all-pole property. To model the combination of these two tracts in the form of an-all pole filter, it is necessary to construct a zero by placing two poles side by side. This zero represents the contribution of the nasal cavity to the vocal cavity.

By moving the two side-by-side poles close together, the modifier means 13 reduce the contribution of the nasal cavity and thereby impart a "head cold" quality to the voice.

The parameters can also be modified as a function of coded data representative of a set of notes defined by their frequencies and their respective durations. Thus the modified voice can follow a score defined in a coding format defining a set of "frequency, duration" pairs and thus have a sung effect. A score is supplied to the means 13 for modifying the reconstruction parameters. The score can use a music coding format such as the MIDI format, the Yamaha® SMAF format, the polyphonic EMR R5 format, the IrDA iMelody format from Infrared Mobile Communications (IrMC), or any other vector description music format. If necessary, the score is transcribed automatically in a preprocessing step so that the frequencies of the notes are in the range from 56 Hz to 444 Hz.

The notes are interpreted in duration and in frequency, and to each note there corresponds a start date, an end date and a frequency. The 5 ms speech frames are modified by the modifier means 13 so that the pitch of the speech is equal to the frequency of the corresponding note at the same time.

The parameters are generally modified by means of exchanges between the data stream formatter and the modifier means 13 for modifying the parameters. Nevertheless, modifying the parameters directly at the level of the vocoder 11 can also be envisaged.

In FIG. 1, the user can select the required type of voice effects to be transmitted via the selector means 14 for selecting a type of modification. He can also configure the modifications of the speech signal reconstruction parameters manually via the means 15. For example, he can alter the value of the modified pitch to Min (P+$P_{effect}$, Max (P)) to transform a masculine voice into a feminine voice by setting the value of $P_{effect}$ himself. He can also try out the effect obtained via the means 16, which enable him to execute the type of modification selected with the parameters that he has set.

During a mobile call, the voice of the user is first sampled and digitized by means 10. It is then coded by the vocoder 11, which implements the step 7 described with reference to FIG. 2.

The coded voice is then formatted by the formatter 12 in the form of voice reconstruction parameters obtained by means of the vocoder 11.

Under the control of the means 14, 15 and 16, the modifier means 13 then modify the formatted voice reconstruction parameters to obtain the effects required by the user. The modified parameters are then forwarded to the means 12, and are then sent to the other party via the telecommunication network or executed in test mode for the user.

Modification of the reconstruction parameters directly at the level of the means 11 by the modifier means 13 can also be envisaged.

Of course, the invention is not limited to the embodiment just described.

In particular, the embodiment described relates to RPE-LTP source coding, but any other form of source coding can be envisaged, for example ETS 300 726 GSM EFR (Enhanced Full Rate) coding and 3 GPP TS 26.071 AM (Adaptive Multirate) coding.

There is claimed:

1. A telecommunication terminal comprising:
   a receiver configured to receive an analog speech signal representing speech of a user of the terminal;

an analog to digital converter configured to convert the analog speech signal into a digital signal;

a coding and extracting unit configured to extract a plurality of reconstruction parameters from the digital signal, the reconstruction parameters including log area ratio coefficients, a fundamental frequency and a pulse excitation signal;

an interface configured to receive an instruction to modify at least one of the reconstruction parameters and, responsive to receiving the instruction, to control a source coder and modifying unit to modify at least one of the reconstruction parameters by a particular amount; and a transmitter configured to transmit the digital signal including the modified reconstruction parameters external to the telecommunication terminal so that a voice associated with the transmitted digital signal has at least one characteristic different from the speech represented by the analog speech signal.

2. The terminal of claim 1, wherein the source coder and modifying unit is further configured to perform regular pulse excited long term prediction (RPE-LTP) coding on the speech signal.

3. The terminal of claim 1, wherein the fundamental frequency has an initial associated pitch and the source coder and modifying unit is configured to modify the initial associated pitch so that the transmitted digital signal has a modified associated pitch which is different from the initial associated pitch of the speech represented by the analog speech signal.

4. The terminal of claim 3, wherein the initial associated pitch is modified to have a value of approximately 120 Hz.

5. The terminal of claim 3 wherein the initial associated pitch is modified to have a value of approximately 210 Hz.

6. The terminal of claim 3, wherein the source coder and modifying unit is further configured to modify a gain of the speech signal.

7. The terminal of claim 6, wherein the source coder and modifying unit is further configured to increase the initial associated pitch and to reduce the gain.

8. The terminal of claim 1, wherein the source coder and modifying unit is configured to modify the reconstruction parameters according to a musical score.

9. The terminal of claim 8, wherein the musical score is in a music format selected from the group consisting of a MIDI format, an SMAF format, a polyphonic EMR R5 format, and an IrDA iMelody format from Infrared Mobile Communications (IrMC).

10. The terminal of claim 1, wherein the instruction that the interface is configured to receive indicates a type of modification that is to be made to the speech signal.

11. The terminal of claim 1, wherein the instruction that the interface is configured to receive indicates which reconstruction parameters are to be modified and the particular amount by which each indicated reconstruction parameter is to be modified.

* * * * *